(12) United States Patent
Englert et al.

(10) Patent No.: US 11,273,823 B2
(45) Date of Patent: Mar. 15, 2022

(54) METHOD FOR DETERMINING A MAXIMUM SPEED OF A VEHICLE DURING A PARKING MANEUVER

(71) Applicant: Robert Bosch GmbH, Stuttgart (DE)

(72) Inventors: Andreas Englert, Suzhou (CN); Lukas Oppolzer, Heilbronn (DE); Thomas Brettschneider, Suzhou (CN); Tobias Putzer, Flein (DE); Toni Frenzel, Kawasaki (JP)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 16/645,832

(22) PCT Filed: Aug. 22, 2018

(86) PCT No.: PCT/EP2018/072609
§ 371 (c)(1),
(2) Date: Mar. 10, 2020

(87) PCT Pub. No.: WO2019/052791
PCT Pub. Date: Mar. 21, 2019

(65) Prior Publication Data
US 2020/0198621 A1    Jun. 25, 2020

(30) Foreign Application Priority Data
Sep. 18, 2017 (DE) .......................... 102017216457.3

(51) Int. Cl.
*B60W 30/06* (2006.01)
*B60T 7/12* (2006.01)
(Continued)

(52) U.S. Cl.
CPC ............... *B60W 30/06* (2013.01); *B60T 7/12* (2013.01); *B60T 17/221* (2013.01);
(Continued)

(58) Field of Classification Search
CPC ............... B60T 17/221; B60T 2220/04; B60T 2210/12; B60T 2210/20; B60T 2210/32;
(Continued)

(56) References Cited

U.S. PATENT DOCUMENTS

| 6,302,823 B1 * | 10/2001 | Eckert | B60K 31/0008 |
| | | | 477/186 |
| 9,623,906 B2 * | 4/2017 | Rohits | B62D 15/028 |
| 2004/0020699 A1 * | 2/2004 | Zalila | B62D 15/028 |
| | | | 180/204 |

(Continued)

FOREIGN PATENT DOCUMENTS

| CN | 112644473 A * | 4/2021 | ......... B62D 15/0285 |
| DE | 10205039 A1 | 8/2003 | |

(Continued)

OTHER PUBLICATIONS

International Search Report for PCT/EP2018/072609, dated Jan. 3, 2019.

*Primary Examiner* — Atul Trivedi
(74) *Attorney, Agent, or Firm* — Norton Rose Fulbright US LLP; Gerard Messina

(57) ABSTRACT

A method for determining a maximum speed of a vehicle during a parking maneuver, in which at least one surroundings condition is detected with the aid of at least one sensor unit and supplied to a control unit as an input variable.

12 Claims, 2 Drawing Sheets

(51) Int. Cl.
*B60T 17/22* (2006.01)
*B62D 15/02* (2006.01)
(52) U.S. Cl.
CPC ...... *B62D 15/0285* (2013.01); *B60T 2210/12* (2013.01); *B60T 2210/20* (2013.01); *B60T 2210/32* (2013.01); *B60T 2220/04* (2013.01); *B60W 2520/10* (2013.01); *B60W 2552/15* (2020.02); *B60W 2552/40* (2020.02); *B60W 2554/801* (2020.02); *B60W 2554/802* (2020.02)

(58) Field of Classification Search
CPC ... B60T 7/12; B60W 2554/801; B60W 30/06; B60W 2552/15; B60W 2552/40; B60W 2554/802; B60W 2520/10; B62D 15/0285
USPC .......................................................... 701/23
See application file for complete search history.

(56) References Cited

U.S. PATENT DOCUMENTS

| | | | | |
|---|---|---|---|---|
| 2012/0310459 | A1* | 12/2012 | Schwitters | B60W 10/06 701/22 |
| 2013/0124041 | A1* | 5/2013 | Belser | B62D 15/0285 701/41 |
| 2014/0121930 | A1* | 5/2014 | Allexi | B60W 30/06 701/70 |
| 2016/0264137 | A1* | 9/2016 | Lavoie | B60W 30/16 |
| 2020/0023833 | A1* | 1/2020 | Martin | B60W 10/18 |
| 2020/0290613 | A1* | 9/2020 | Trainor | B60L 15/2081 |

FOREIGN PATENT DOCUMENTS

| | | | | |
|---|---|---|---|---|
| DE | 10325650 | A1 | 12/2004 | |
| DE | 102007029773 | A1 * | 12/2008 | ............... B60Q 1/40 |
| DE | 102009053939 | A1 | 6/2010 | |
| DE | 102012202175 | A1 | 8/2013 | |
| DE | 102012216986 | A1 | 3/2014 | |
| DE | 102015207038 | A1 | 10/2016 | |
| DE | 102015222934 | A1 | 5/2017 | |
| DE | 102016104575 | A1 * | 9/2017 | ......... B60W 30/188 |
| EP | 1642767 | A1 * | 4/2006 | ........... B62D 15/027 |
| EP | 1966030 | A1 * | 9/2008 | ........... B62D 15/028 |
| GB | 2546149 | A  * | 7/2017 | ........... B60W 40/02 |
| WO | WO-2007050407 | A1 * | 5/2007 | ............... B60T 7/22 |
| WO | WO-2009000373 | A1 * | 12/2008 | ............... B60Q 1/40 |
| WO | WO-2012041670 | A1 * | 4/2012 | ........ G01S 7/52004 |

* cited by examiner

METHOD FOR DETERMINING A MAXIMUM SPEED OF A VEHICLE DURING A PARKING MANEUVER

FIELD

The present invention relates to a method for determining a maximum speed of a vehicle during a parking maneuver.

BACKGROUND INFORMATION

A method is described for determining a maximum speed of a vehicle during a parking maneuver is described in German Patent Application No. DE 102 05 039 A1. With the aid of this method, it is possible to generate specific accelerator characteristic curves in such a way that, for example, an accelerator characteristic curve is generated as a function of the maximum permissible speed in which the internal combustion engine of the vehicle, even with a fully depressed accelerator pedal, operates only in a partial load operation, and thus is not able to exceed a particular maximum speed. In this regard, the conventional method provides for detecting detect at least one surroundings condition with the aid of sensors and its supply as an input variable to a control unit. A surroundings condition shall, for example, be understood to mean a friction coefficient between the vehicle or the vehicle tire and the roadway surface, parking surroundings, (i.e., for example, the distance from an obstacle during a parking process) and the detection of the vehicle inclination (downhill grade or uphill grade of the roadway). The conventional method thus makes it possible to limit the maximum speed during a parking process to a maximum value, as a function of the at least one detected surroundings condition, and to generate a corresponding accelerator characteristic curve.

In addition, fully automated parking maneuvers are described in the related art, in which sensor units of the vehicle detect the size or the dimension of a parking spot and activate a steering unit of the vehicle in such a way that the vehicle may be parked into the parking spot. At present, it is provided, in particular, due to legal requirements, that the driver specifies the vehicle speed or accelerates accordingly, whereas deceleration processes may also be carried out fully automatically, in particular, as a function of an identified obstacle. Although, having knowledge of the related art mentioned first, for example, a maximum permissible vehicle speed or a corresponding accelerator characteristic curve may be provided, the deceleration process itself, which, of course, requires a different distance (which is taken into consideration in the maximum possible speed) as a function of, for example, the frictional conditions, is always based on the assumption that the braking system of the vehicle has certain setpoint values with respect to the possible deceleration or has its full performance capability.

It is furthermore conventional to equip the braking system of a vehicle with multiple brake circuits for safety reasons. At least two actuators are used in the process, one primary actuator, for example in the form of a hydraulic element, and one secondary actuator, for example in the form of an electromechanical actuator, the secondary actuator usually having a lower performance capability than the primary actuator, and both actuators being designed to act on one and the same braking element, in particular, a disk brake of the vehicle, to decelerate the vehicle. Moreover, it is conventional to use automatically the secondary actuator in the event of failure of the primary actuator.

SUMMARY

An example method according to the present invention for determining a maximum speed of a vehicle during a parking maneuver may have the advantage that, in addition to at least one surroundings condition, additionally the maximum possible deceleration of the secondary actuator of the braking system of the vehicle is taken into consideration. This has the advantage that a collision of the vehicle during parking with an obstacle, for example, may always be reliably prevented, even in the event of a sudden failure of the primary actuator, since in this case the vehicle may still be safely decelerated using the secondary actuator of the braking system.

Usually, during highly automated or autonomous parking processes, the primary actuator is generally used for decelerating or stopping the vehicle in front of an obstacle, for example. This main actuator has its full performance capability as long as no defect is present. As soon as an error of the main actuator is present, which was typically identified by appropriate software or hardware measures, it is ensured by the secondary actuator that the vehicle may be decelerated from the driving condition into the standstill. The secondary actuator has a lower performance capability than the main actuator. The lower performance capability of the secondary actuator manifests itself, in particular, in an extended stopping distance. In practice, such a secondary actuator is designed as an integral part of an automatic parking brake, of an electric brake booster or as an integral part of an ESP system.

Advantageous refinements of the example method according to the present invention are described herein.

One particularly preferred method in accordance with the present invention provides that the primary actuator is used for actuating the braking element as long as the performance capability of the primary actuator is greater than that of the secondary actuator. In this way, additional safety is created since the stopping distance thus achievable is shorter than that using the secondary actuator.

One further optimization of the example method described thus far provides that an instantaneously possible maximum deceleration of the at least one actuator is ascertained based on additional information, such as the brake wear and/or the braking effect. Such a method thusly enables an optimization in that possible decelerations below the values stored in the control unit or the control device are taken into consideration in the calculation of the maximum possible parking speed.

Both the maximum deceleration of the primary actuator and, in particular, the maximum possible deceleration of the secondary actuator may, for example, be predefined by values stored in the control unit. Such maximum deceleration values stored in the control unit for the primary actuator and the secondary actuator may, for example, be ascertained in test phases of the vehicle at the vehicle manufacturer and be stored in the control unit, if necessary taking additional safety margins into consideration. The values may, in particular, be stored in the form of characteristic maps in which the maximum possible decelerations are stored, for example taking a particular friction coefficient or a particular uphill grade into consideration. It is furthermore possible to carry out a linear interpolation between adjoining stored values, for example. Overall, stored values have the advantage that the control unit does not need to carry out comprehensive calculations so that a faster response time and lower costs (memory, computing capacity for the processor) are achievable for the control device or the control unit.

It is furthermore most particularly preferred when the at least one surroundings condition is an uphill grade (i.e., the roadway inclination in the area of the vehicle) and/or a friction coefficient between a tire and the roadway surface and/or a distance from an obstacle. All three surroundings conditions, both individually and in combination, may have a direct influence on the calculation of the maximum possible parking speed.

In the case of an uphill grade on which a vehicle is situated, it is calculated with the aid of suitable units. Thereafter, axle loads on the front and rear axles may be ascertained based on an assumed or also measured vehicle mass, and assuming the position of the vehicle center of gravity. These axle loads result in maximum possible decelerations and thus, in turn, conversely, in maximum possible speeds for the adherence to stopping distances. In a first preferred embodiment of the example method described last, it may be provided that the uphill grade is, or the stopping distances are, ascertained once at the start of the parking process or, in the case of multi-step parking maneuvers, at the start of each step. Such an embodiment of the method, with a respective ascertainment of the uphill grade, has the advantage that the vehicle is at a standstill at the start of the parking maneuver and, as a result, a particularly precise uphill grade signal may be obtained, for example, from an acceleration sensor since this is not distorted by accelerations of the vehicle due to the vehicle movement.

In one alternative embodiment of the example method last described, it may also be provided that the uphill grade is ascertained continuously, taking the odometry data into consideration. The odometry data may be ascertained, e.g., based on wheel speed sensors. In this way, it is possible, for example, to calculate an acceleration from the instantaneous speed, which may be subtracted from an instantaneous acceleration signal to calculate a particularly precise uphill grade. The signal may furthermore be smoothed over time. Such a method has, in particular, the advantage that changes in the uphill grade during the parking maneuver are also taken into consideration, and the safety is further enhanced thereby.

One further variant of the method according to the present invention, taking a surroundings condition into consideration, provides that the range of the distance sensor is used as the distance in the case that the at least one surroundings condition is the distance from an obstacle, and no obstacle is ascertained with the aid of a distance sensor. Such a method has the advantage that a maximum possible speed during the parking process may be achieved without a decrease in safety.

The method according to the present invention described thus far is particularly preferably used during parking processes which are carried out as fully automatic parking processes, such parking processes typically being characterized by a control of the speed or of the braking process to be carried out by the driver, and, if necessary, automatic (emergency) braking processes being initiated in the case of identified obstacles and insufficient braking processes carried out by the driver.

Furthermore, a fully automatic parking process within the meaning of the present invention shall, however, additionally also be understood to mean parking processes in which the vehicle parks autonomously, i.e., the driver is situated outside the vehicle.

It is furthermore particularly preferred when, during an automatic parking process, the parking process is terminated when a defect of the primary actuator is identified by initiating a brake application with the maximum possible deceleration. In this way, it is signaled, in particular, also to the driver (usually in connection with an additional visual display and/or an acoustic warning) that the braking system does not have the full performance capability.

One further variant of the example method described thus far provides, with respect to a particular sensitive control of the speed by the driver, that an accelerator characteristic curve is set as a function of the ascertained maximum possible speed during the parking process. What is meant here is that the maximum possible speed may be achieved with a full actuation or depression of the accelerator pedal in the accordingly engaged gear, but not a speed which is higher.

Further advantages, features and details of the present invention are derived from the following description of preferred exemplary embodiments and based on the figures.

BRIEF DESCRIPTION OF THE DRAWINGS

Identical elements and elements having identical functions are denoted by identical reference numerals in the figures.

DETAILED DESCRIPTION OF EXAMPLE EMBODIMENTS

Figure 1:
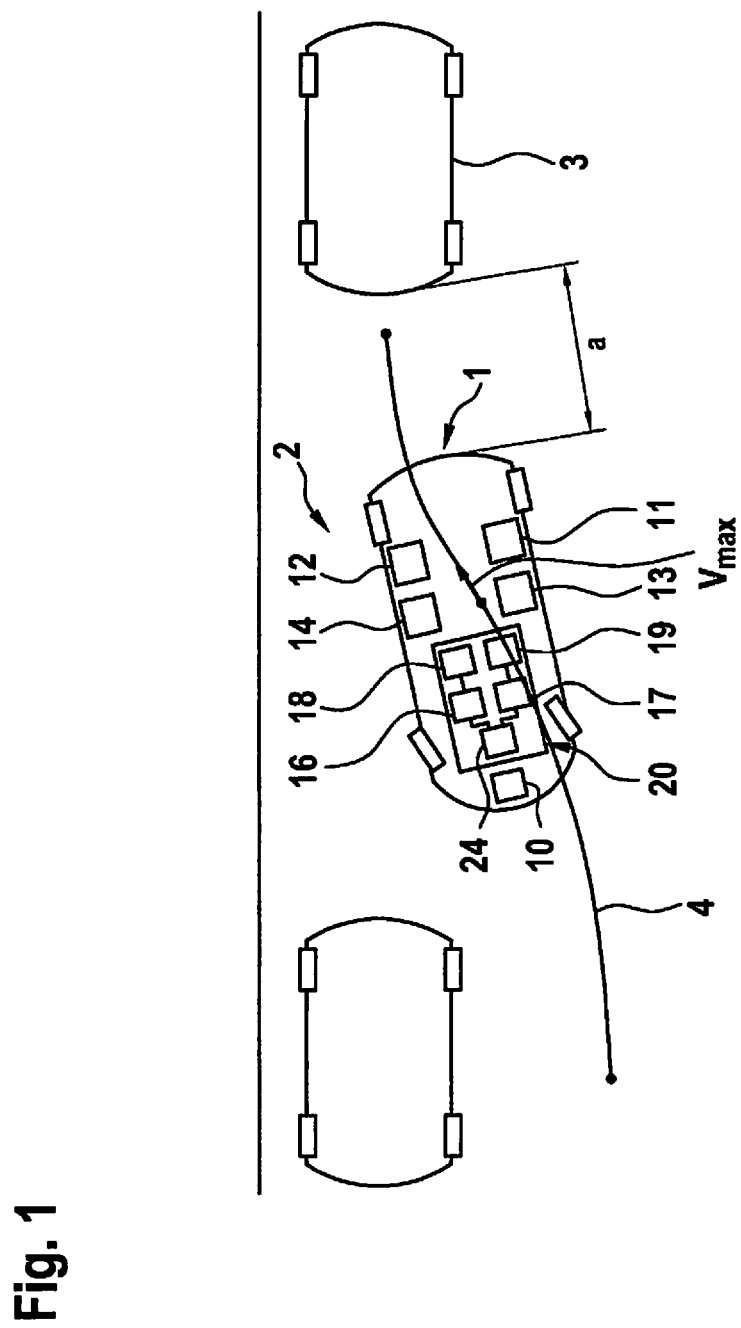
FIG. 1 shows a simplified illustration of a vehicle during a fully automatic parking process.

FIG. 1 shows a (fully) automated parking process of a vehicle 1 into a parking spot 2 in a highly simplified manner. Vehicle 1 is already situated within parking spot 2 at a distance a from a further vehicle 3 in the reverse driving direction of vehicle 1, vehicle 3 representing an obstacle. $V_{max}$ denotes the presently maximum driving speed of vehicle 1 in the direction toward further vehicle 3, which must not be exceeded to ensure safe stopping of vehicle 1 within distance a prior to a collision with further vehicle 3.

Furthermore, it is assumed for the automatic parking process that the driver both specifies present driving speed V by a corresponding actuation of the accelerator pedal, and brings vehicle 1 to a standstill by an actuation of the brake. As an alternative, it may be provided that a control unit 10 of vehicle 1 carries out a fully automatic brake application of vehicle 1, should the driver not initiate a corresponding braking maneuver in a timely manner or actuate the brake pedal in such a way that a braking of vehicle 1 in front of further vehicle 3 is ensured.

Figure 2:
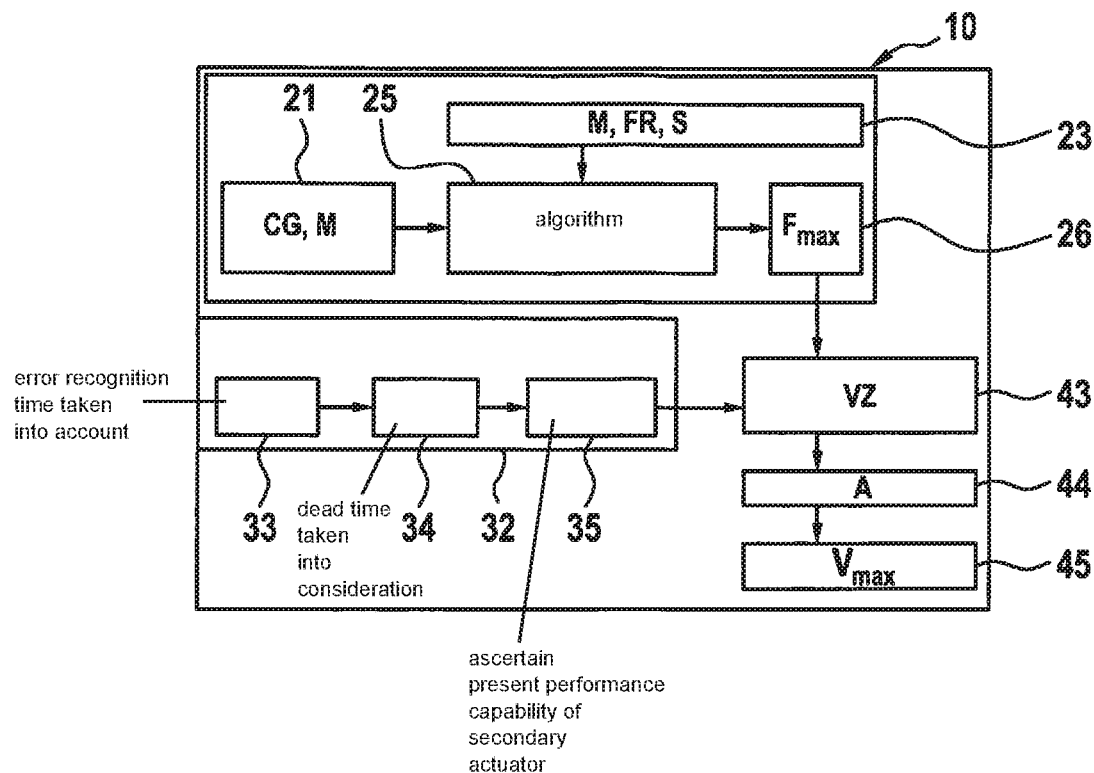
FIG. 2 shows a block diagram to elucidate the calculation of a maximum speed during the parking process.

FIG. 2 shows a block diagram to elucidate the calculation of presently maximum possible speed $V_{max}$ of vehicle 1 during the parking process. It is assumed in the process that vehicle 1, in the conventional manner, includes a first sensor unit 11 for detecting distance a from an obstacle or from further vehicle 3 in the direction of the respective driving or parking direction. Vehicle 10 furthermore includes a second sensor unit 12 for detecting the driving direction or route 4. A third sensor unit 13 is designed to ascertain, for example based on an ascertained or a detected uphill grade of the roadway on which vehicle 1 is presently situated, the axle loads on the front axle and the rear axle of vehicle 1. Lastly, a fourth sensor unit 14 may optionally be provided, which is designed to ascertain a friction coefficient μ between the tire and the road or the roadway. If no fourth sensor unit 14 is provided, the corresponding data may also be ascertained based on other surroundings data, for example, or be stored as a predefined value in control unit 10.

Furthermore, it is assumed that a braking system 20 of vehicle 1 includes a primary actuator 16 and a secondary actuator 17, which (automatically) takes effect instead of primary actuator 16 in the event of a defect of primary actuator 16. Both primary actuator 16 and secondary actuator 17 are an integral part of at least one brake circuit of braking system 20 of vehicle 1 and act on a braking element 24, for example on the brake disk(s) of vehicle 1.

A first arrangement 18, which is assigned to primary actuator 16, are used to detect the present performance capability of primary actuator 16, for example taking the brake wear or the braking effect into consideration. Second arrangement 19 is assigned to secondary actuator 17 and, similarly to first arrangement 18, is used to ascertain the present performance capability of secondary actuator 17, in particular, the maximum possible braking force $F_{Brake}$.

FIG. 2 shows a first program block 21, which supplies predefined data of vehicle 1, for example position of center of gravity CG of vehicle 1 and mass M of vehicle 1, as input variables to an algorithm 25, which is an integral part of control unit 10. A friction coefficient μ between the tires of vehicle 1 and the roadway is ascertained within a second program block 23, or a corresponding value is predefined. Driving direction FR and uphill grade S of the roadway are also ascertained, each taking the present position of vehicle 1 into consideration.

The values ascertained in second program block 23 are also supplied to algorithm 25 as input variables. In a step 26, algorithm 25 ascertains a maximum transmittable force $F_{max}$, which may be transmitted from vehicle 1 onto the roadway, from the indicated input values.

A third program block 32 relates to secondary actuator 17. In a step 33, the error recognition time is taken into consideration which elapses until control unit 10 of vehicle 1 recognizes that primary actuator 16 has failed or has a performance capability which is lower than the performance capability of secondary actuator 17. In step 34, the dead time is taken into consideration which is required for secondary actuator 17 to be activated instead of primary actuator 16. In a step 35, the present performance capability of secondary actuator 17, i.e., the transmittable braking force $F_{Brake}$, is subsequently ascertained. This value is supplied to a fourth program block 43 as an input variable.

In fourth program block 43, a possible deceleration VZ of secondary actuator 17 is ascertained, taking maximum transmittable force $F_{max}$ from step 26 into consideration.

In a subsequent fifth program block 44, a stopping distance A may be ascertained based on present speed V and possible deceleration VZ with the aid of secondary actuator 17. This stopping distance A is subsequently used in a sixth program block 45 to ascertain maximum possible speed $V_{max}$ which vehicle 1 may presently have to enable safe stopping within available distance a from further vehicle 3.

Figure 3:
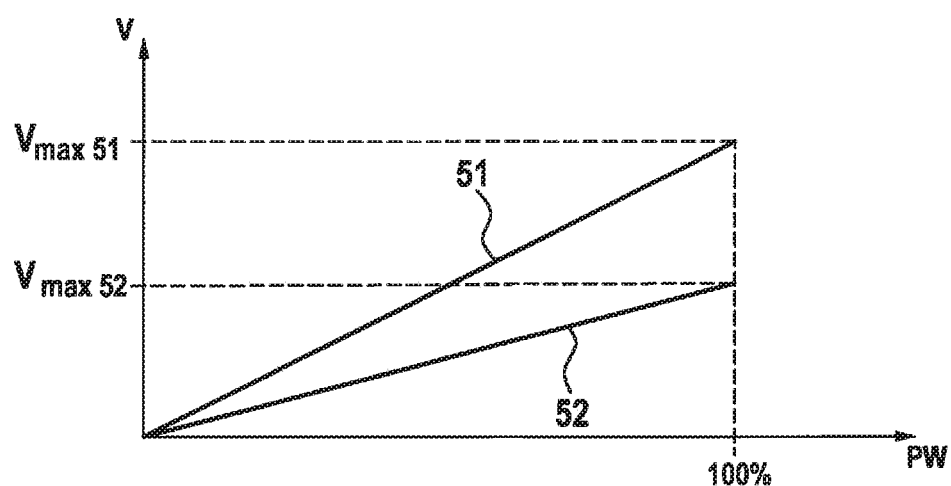
FIG. 3 shows a chart to elucidate different accelerator characteristic curves, taking different maximum parking speeds into consideration.

The ascertained maximum speed $V_{max}$ may be translated into a corresponding accelerator characteristic curve 51, 52 in accordance with the representation of FIG. 3. For elucidation, two accelerator characteristic curves 51, 52 for different maximum speeds $V_{max\ 51}$ and $V_{max\ 52}$ are shown against pedal travel PW in the illustration in FIG. 3. In particular, it is apparent that the driver himself or herself, with a maximally depressed accelerator pedal in each case, is at the most able to achieve the corresponding maximum speed $V_{max\ 51}$ or $V_{max\ 52}$, accelerator characteristic curve 51, 52, as elucidated above based on the illustration of FIG. 2, being adapted to the present performance capability of secondary actuator 17.

The method described thus far may be altered or modified in a variety of ways, without departing from the inventive idea. For example, it is provided that the sensor range of first sensor unit 11 is assessed as a corresponding distance a in the event that first sensor unit 11 does not detect an obstacle or a further vehicle 3 in the driving direction.

What is claimed is:

1. A method for determining a maximum speed of a vehicle during a parking maneuver of a parking process, comprising the following steps:
    detecting at least one surroundings condition using at least one sensor unit;
    supply the detected at least one surroundings condition to a control unit as an input variable;
    ascertaining a maximum possible deceleration of at least one brake circuit of a braking system of the vehicle; and
    supplying the ascertained maximum possible deceleration to the control unit as another input variable to determine the maximum speed, the braking system including at least two actuators for actuating a braking element, the at least two actuators including a primary actuator and a secondary actuator, the secondary actuator being actuated at least in the event of a failure of the primary actuator, wherein the maximum possible deceleration is ascertained taking a performance capability of the secondary actuator into consideration.

2. The method as recited in claim 1, wherein the primary actuator is used to actuate the braking element as long as a performance capability of the primary actuator is greater than that of the secondary actuator.

3. The method as recited in claim 1, wherein a presently possible maximum deceleration of the at least one actuator is ascertained based on additional information.

4. The method as recited in claim 3, wherein the additional information includes brake wear and/or braking effect.

5. The method as recited in claim 1, wherein maximum possible decelerations of the primary and secondary actuators are predefined values which are stored in the control unit in the form of characteristic maps.

6. The method as recited in claim 1, wherein the at least one surroundings condition is an uphill grade and/or a friction coefficient and/or a distance from an obstacle.

7. The method as recited in claim 6, wherein the at least one surroundings condition is the uphill grade, the uphill grade being ascertained once at a start of the parking process or, in the case of multi-step parking maneuvers, at a start of each step of the multi-step parking maneuvers.

8. The method as recited in claim 6, wherein the at least one surroundings condition is the uphill grade, the uphill grade being continuously ascertained, taking odometry data into consideration.

9. The method as recited in claim 6, wherein in the at least one surroundings condition is the distance from an obstacle and when no obstacle is ascertained using a distance sensor, the range of the distance sensor is used as the distance.

10. The method as recited in claim 1, wherein the parking process is carried out as a fully automatic parking process.

11. The method as recited in claim 10, wherein the parking process is terminated when a defect of the primary actuator is identified by initiating a brake application with the maximum possible deceleration.

12. The method as recited in claim 1, wherein an accelerator characteristic curve is set as a function of the ascertained maximum possible speed.

* * * * *